No. 869,931. PATENTED NOV. 5, 1907.
J. M. McINTOSH.
WALL PAPER CLEANER.
APPLICATION FILED JULY 19, 1907.

Witnesses
Harry A. Rastetter
Sylvia Boron

Inventor
Jacob M. McIntosh
By F. W. Bond
Attorney

UNITED STATES PATENT OFFICE.

JACOB M. McINTOSH, OF WARREN, OHIO.

WALL-PAPER CLEANER.

No. 869,931.

Specification of Letters Patent.

Patented Nov. 5, 1907.

Application filed July 19, 1907. Serial No. 384,652.

*To all whom it may concern;*

Be it known that I, JACOB M. McINTOSH, a citizen of the United States, residing at Warren, in the county of Trumbull and State of Ohio, have invented certain new and useful Improvements in Wall-Paper Cleaners; and I do hereby declare that the following is a full, clear, and exact description of the same, reference being had to the accompanying drawing, making a part of this specification, and to the numerals and figures of reference marked thereon, in which—

Figure 1:
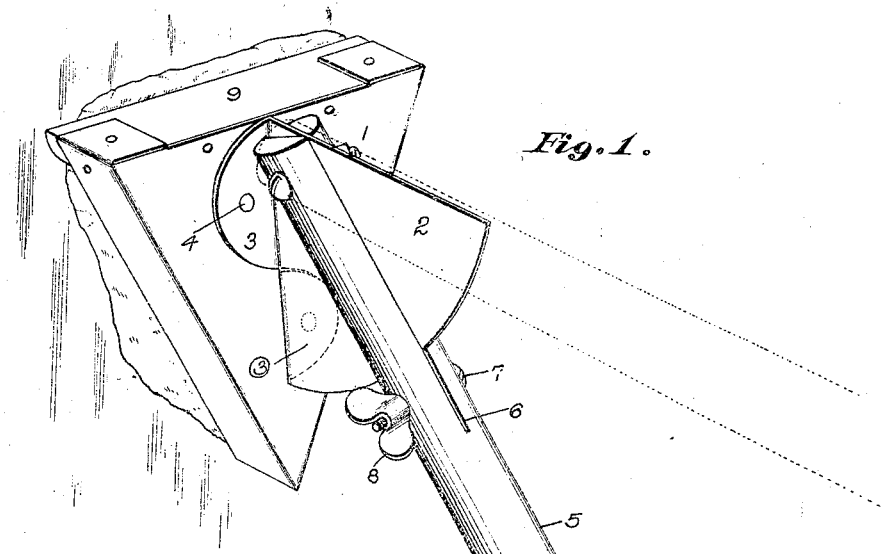
Figure 2:
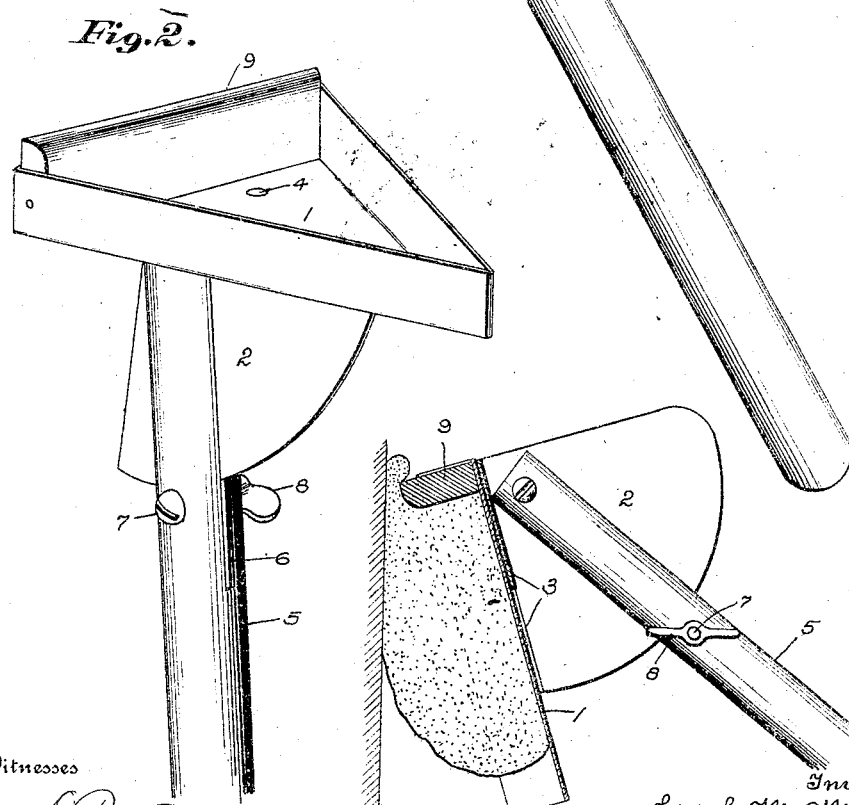
Figure 3:
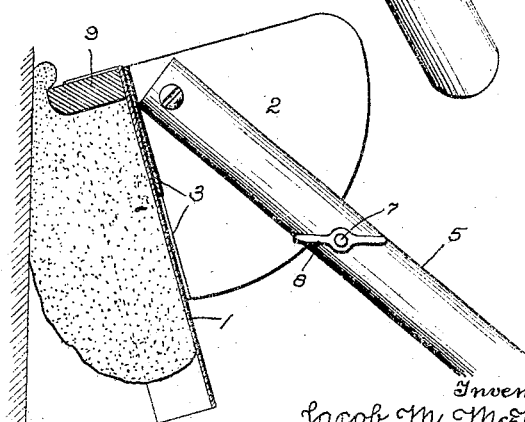

Figure 1 is a perspective view showing the different parts properly connected. Fig. 2 is a perspective view, showing the cleaning substance removed from the receptacle and the receptacle adjusted in different position from that illustrated in Fig. 1. Fig. 3 is a section of the cleaning substance retaining receptacle, showing the cleaner in position for vertical walls and the cleaning substance in proper position in the receptacle.

The present invention has relation to wall paper cleaner and it consists in the novel arrangements hereinafter described and particularly pointed out in the claims.

Similar numerals of reference indicate corresponding parts in all the figures of the drawing.

In the accompanying drawings, 1 represents the receptacle proper, which is preferably formed tri-angular as shown. To the bottom of the receptacle is attached the blade 2 by means of the integral flanges 3 and suitable rivets 4. To the blade 2 is pivotally attached the handle 5, which handle may be of any desired length. The handle 5 is provided with the narrow slot 6, in which narrow slot the blade 2 is inserted. The handle 5 is provided with the clamping bolt 7, which clamping bolt is provided with the thumb nut 8 and is for the purpose of clamping the members of the handle upon opposite sides of the narrow slots 6 firmly against the blade 2, thereby holding the receptacle 1 at any desired angle with reference to the handle. One side of the receptacle, and what might be termed the upper side is provided with the plate 9 the outer edge of which is extended a short distance beyond the edges of the remaining plates or sides of the receptacle, said outer extended portion being rounded. The rounded part being located upon the inner side and is so located for the purpose hereinafter described.

As shown the receptacle proper is tri-angular in form and is so formed for the purpose of giving a tri-angular form to the plastic cleaning substance placed in the receptacle. The cleaning substance may be of any well known make such as is commonly used by hand, but in this case it must be of such a nature that it will be pliable or have about the consistency of bread dough as to pliability and toughness. In use this cleaning material is placed in the receptacle as illustrated in Figs. 1
and 2 after which the device is in condition for use and is
moved over the wall paper. The pointed end of the tri-angular receptacle being the forward end, by which arrangement the width of the strip cleaned is the entire width of the widest part of the receptacle, but at the start the entire width of the receptacle is not utilized, by which arrangement the cleaning substance is moved upon the wall paper more easily, owing to the fact that less resistance will be offered as between the wall paper and the cleaning substance.

It will be understood that after the cleaning substance is moved upon the wall paper or surface being cleaned the tendency will be to move the cleaning material upward or back of the plate 9 as illustrated in Fig. 3.

It will be understood that the portion of the cleaning material which has passed back of the plate 9 can be rolled forward or into the receptacle thereby presenting a clean surface or exposing a clean portion of the cleaning material, this process being repeated from time to time as required, until the cleaning material has been used, until it is no longer suitable, owing to the dust and dirt adhering to and mingling with the plastic cleaning material.

The object and purpose of rounding the inner plate 9 is to permit the easy backward movement of the cleaning material.

It will be understood that by simply loosening the thumb nut 8 the blade 2 is free to move through the slot 6 but when the nut 8 is turned so as to clamp the blade the proper cleaning material or receptacle will be held in fixed adjustment with reference to the handle.

I have shown the receptacle formed tri-angular, but I do not desire to be confined to this exact form, owing to the fact that other forms of receptacles may be used without departing from the nature of the present invention.

Having fully described my invention what I claim as new and desire to secure by Letters Patent, is—

1. In a wall paper cleaner, a receptacle provided with a blade, a handle pivotally attached to said blade and means for clamping the handle upon the blade, said receptacle provided with a plate having a rounded edge, substantially as and for the purpose specified.

2. In a wall paper cleaner, the combination of a tri-angular receptacle, one side of the tri-angular receptacle provided with an extended and rounded edge, a blade connected to said receptacle and a handle pivotally attached to said blade, said receptacle adapted to hold wall paper cleaning material, substantially as and for the purpose specified.

In testimony that I claim the above, I have hereunto subscribed my name in the presence of two witnesses.

JACOB M. McINTOSH.

Witnesses:
E. J. THOMPSON,
GEO. M. SMITH.